United States Patent [19]

Yamada

[11] Patent Number: 4,461,565

[45] Date of Patent: Jul. 24, 1984

[54] OPTICAL SCANNING DEVICE

[75] Inventor: Yu Yamada, Kokubunji, Japan

[73] Assignee: Canon Kabushiki Kaisha, Tokyo, Japan

[21] Appl. No.: 495,733

[22] Filed: May 20, 1983

Related U.S. Application Data

[63] Continuation of Ser. No. 359,032, Mar. 17, 1982, abandoned, which is a continuation of Ser. No. 136,180, Mar. 31, 1980, abandoned.

[30] Foreign Application Priority Data

Apr. 16, 1979 [JP] Japan .................................. 54-46204
Apr. 16, 1979 [JP] Japan .................................. 54-46205

[51] Int. Cl.³ ............................................ G03G 15/28
[52] U.S. Cl. .......................................... 355/8; 355/11; 355/47; 355/49
[58] Field of Search .................... 355/8, 11, 50, 51, 47, 355/49

[56] References Cited

FOREIGN PATENT DOCUMENTS 2211197 10/1972 Fed. Rep. of Germany .......... 355/8
3016068 11/1980 Fed. Rep. of Germany .......... 355/8
54-44518 4/1979 Japan ..................................... 355/8

OTHER PUBLICATIONS

IBM Technical Disclosure Bulletin, vol. 15, No. 9, 2-1973, pp. 2683-2686 & 2687-2692.
IBM Technical Disclosure Bulletin, vol. 15, No. 4, Sep. 1972, pp. 1256-1257.

Primary Examiner—Monroe H. Hayes
Attorney, Agent, or Firm—Fitzpatrick, Cella, Harper & Scinto

[57] ABSTRACT

This specification discloses an optical scanning device in a copying machine or the like of the slit exposure scanning type in which two scanning mirrors are disposed in an optical path between an image forming element and a photosensitive surface which is the image plane and during the slit scanning, an original surface which is the object surface and the image forming element are fixed, characterized in that the two scanning mirrors are moved along the quadratic curve-like loci of the optical reflection point or straight line-like loci approximate thereto, whereby the scanning mirrors are made compact.

5 Claims, 6 Drawing Figures

OPTICAL SCANNING DEVICE

This application is a continuation of application Ser. No. 359,032 filed Mar. 17, 1982, which is a continuation of Ser. No. 136,180 filed Mar. 31, 1980, both now abandoned.

BACKGROUND OF THE INVENTION

1. Field of the Invention

This invention relates to an optical scanning device of the compact slit exposure type in which an original and a lens are fixed and which has a scanning system on the image field side.

2. Description of the Prior Art

Copying machines or the like of the slit exposure scanning type have heretofore been classified into a type which has a scanning system on the object field side and a type which has a scanning system on the image field side. The object field side is the area in the optical path from the original to the lens and the image field side is the area from the lens to the photosensitive medium.

As examples of the former, there are Japanese Patent Publication No. 6647/1964 and Japanese Utility Model Publication No. 6456/1970, and as examples of the latter, there are Japanese Patent Publication No. 30013/1971, Japanese Utility Model Publication No. 13075/1971, Japanese Patent Publication No. 10259/1968 and Japanese Laid-open Patent Application No. 102041/1978. Generally, where there is a scanning system on the object field side, it is necessary to change the movement velocity of the scanning system in accordance with the copying magnification, but where there is a scanning system on the image field side, the movement velocity of the scanning system can be made constant irrespective of the copying magnification. Incidentally, Japanese Patent Publication No. 30013/1971 which is a prior art example in which there is a scanning system on the image field side has suffered from a problem that the vicinity in which the principal ray is coincident with the optic axis cannot be used and therefore the use of a lens having a wide angle of view is required. Japanese Utility Model Publication No. 13075/1971, Japanese Patent Publication No. 10259/1968 and Japanese Patent Publication No. 13474/1971 have included translational movement as well as rotational movement and this has led to complication of the mechanism. Japanese Laid-open Patent Application No. 10204/1978 discloses that a lens whose maximum angle of view with respect to the optic axis is about half that of Japanese Patent Publication No. 30013/1971 is sufficient and the scanning system on the image field side should have only rectilinear movement. However, it has still suffered from the problem that because the reflection points of two mirrors constituting the image field side scanning system change from moment to moment during scanning, the effective portion of the mirrors must be made large and a correspondingly greater dead space in scanning must be secured resulting in increased weight which is disadvantageous for the scanning.

SUMMARY OF THE INVENTION

It is the object of the present invention to provide a compact optical scanning device, and particularly an optical scanning device in which the scanning mirrors on the image field side are compact.

Such object is achieved by causing the supports of two scanning mirrors constituting the image field side scanning system to be moved at an equal velocity in directions of different predetermined straight lines and along therewith, causing the two scanning mirrors to be moved along quadratic curves which are the loci of optical reflection points or along straight lines approximate thereto. When the scanning mirrors are moved along the quadratic curves, their movements are at unequal velocities in contrast with the equal-velocity rectilinear movements of the scanning mirror supports.

The invention will become fully apparent from the following detailed description thereof taken in conjunction with the accompanying drawings.

DESCRIPTION OF THE PREFERRED EMBODIMENTS

Figure 1:
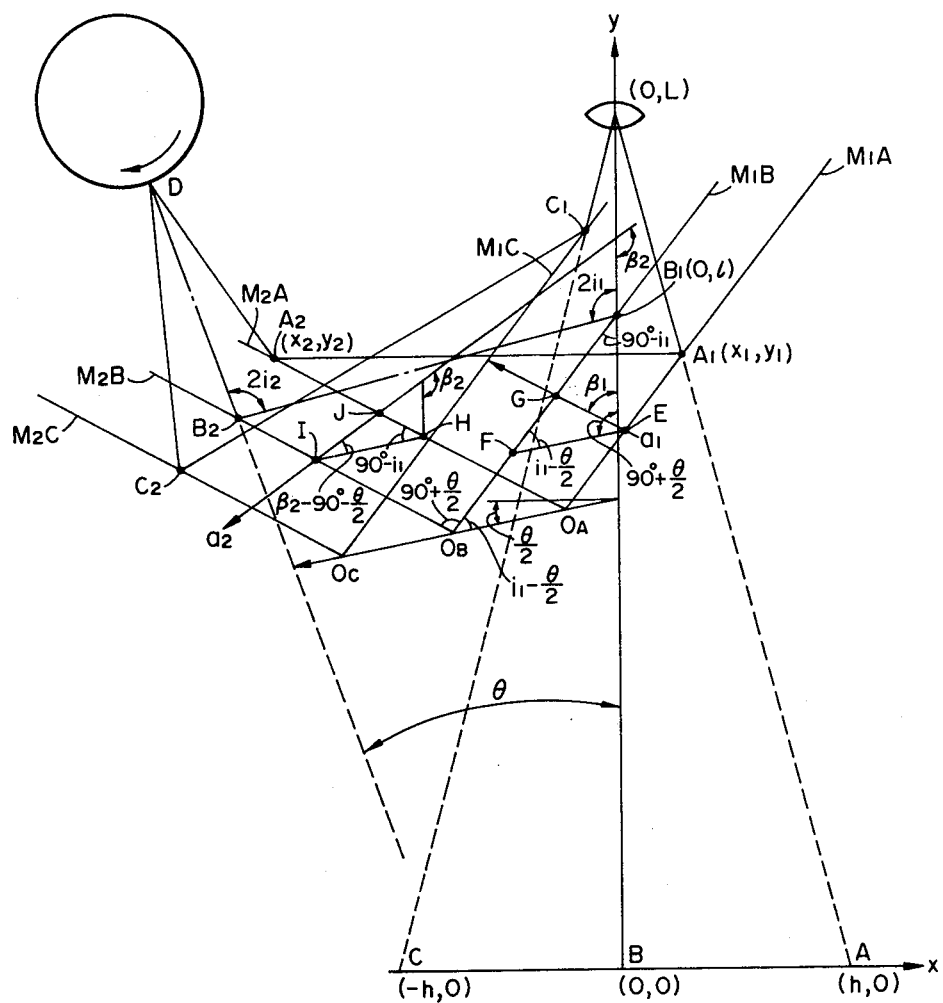
FIG. 1 shows the optical scanning device according to the prior art.

FIG. 1 shows the optical system of Japanese Laid-open Patent Application No. 102041/1978 which is a prior art example using a scanning system on the image field side.

When the angle formed between the incidence optic axis of a mirror $M_1$ ($M_1A$, $M_1B$, $M_1C$) and the emergence optic axis of a mirror $M_2$ ($M_2A$, $M_2B$, $M_2C$) is $\theta$ and the peripheral velocity of a photosensitive medium is $V_0$, scanning mirrors $M_1$ and $M_2$ are translationally moved as a unit, at an equal velocity of $V_0/2 \cos(\theta/2)$ in the direction of $O_A O_B O_C$, namely, the direction forming an angle of $90° + (\theta/2)$ with the incidence optic axis. By the mirrors $M_1$ and $M_2$ being translationally moved as a unit, the reflection point of the mirror $M_1$ changes to $A_1$, $B_1$ and $C_1$ and the reflection point of the mirror $M_2$ changes to $A_2$, $B_2$ and $C_2$. From this, it is known that the effective portions of the mirrors must be made large.

The intersection co-ordinates of the mirrors and principal ray are calculated below.

Assume that the incidence optic axis is the y-axis and the image plane in the absence of the mirrors is the x-axis. Let the scanning image points be $A(h, o)$, $B(o, o)$ and $C(-h, O)$. Also, let the pupil of the lens which is adjacent to the photosensitive medium be $(O, L)$. By the scanning mirror system, the image points A, B and C are caused to coincide with the photosensitive medium slit position D. Let $A_1(x_1, y_1)$ be the intersection between the principal ray passing to the image point A and the mirror $M_1A$, $A_2(x_2, y_2)$ be the intersection between such principal ray and the mirror $M_2A$, $B_1(O, l)$ and $B_2$ be the intersections between the principal ray passing to the image point B and the mirrors, and $C_1$ and $C_2$ be the intersections between the principal ray passing to the image point C and the mirrors. Also, let $i_1$ be the angle of incidence of the incidence optic axis on the mirror $M_1$, and $i_2$ be the angle of incidence of the incidence optic axis on the mirror $M_2$. Here, $(180° - 2i_1) + (180° - 2i_2) + \theta = 180°$. For the scanned distance h from the image point A to the image point B, the distance of movement of the intersection $O(O_A, O_B, O_C)$ between the mirror $M_1$ and the mirror $M_2$ is $$\overline{O_A O_B} = \frac{h}{2 \cos \frac{\theta}{2}}$$

and such intersection moves in a direction inclined by $\theta/2$ with respect to the x-axis.

From $$\overline{EF} = \overline{O_A O_B} = \frac{h}{2 \cos \frac{\theta}{2}},$$

the equation for the mirror $M_1A$ is given as:

$$y = x \tan i_1 + l - \frac{h \sin\left(i_1 - \frac{\theta}{2}\right)}{2 \cos \frac{\theta}{2} \cdot \cos i_1}$$

Also, the equation for the principal ray at the image point A is $$y = -(Lx/h) + L$$

Accordingly, the intersection $A_1(x_1, y_1)$ becomes as follows:

$$x_1 = \frac{L - l + \frac{h}{2}\left(\tan i_1 - \tan \frac{\theta}{2}\right)}{\tan i_1 + \frac{L}{h}}$$

$$y_1 = L - \frac{L - l + \frac{h}{2}\left(\tan i_1 - \tan \frac{\theta}{2}\right)}{1 + \frac{h}{L} \tan i_1}$$

If h is eliminated here, $$y_1^2 - (L + l + x_1 \tan i_1)y_1 +$$

$$L\left\{\frac{1}{2}\left(\tan i_1 + \tan \frac{\theta}{2}\right) x_1 + l\right\} = 0$$

From this, it is known that the locus of the intersection between the mirror $M_1$ and the principal ray generally becomes a quadratic curve.

Figure 2A:
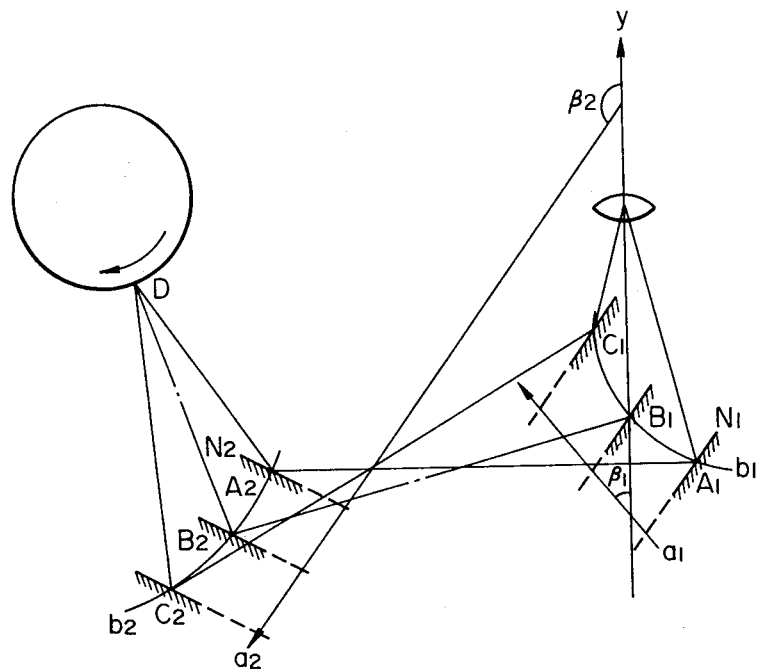
FIGS. 2A and 2B are optical illustrations of two embodiments of the present invention.

Likewise, the locus of the intersection $(x_2, y_2)$ between the mirror $M_2$ and the principal ray generally becomes a quadratic curve. Now, consider small mirrors $N_1$ and $N_2$ which comprise part areas of the mirrors $M_1$ and $M_2$, as shown in FIG. 2A, and consider a system in which, instead of moving the mirrors $M_1$ and $M_2$ in the direction of $O_A \cdot O_B \cdot O_C$, the supports of the small mirrors $N_1$ and $N_2$ are moved in the directions of straight lines $a_1$ and $a_2$, respectively, and along therewith, the small mirrors $N_1$ and $N_2$ move on predetermined quadratic curves $b_1$ and $b_2$, respectively.

Here, the movement velocities of the supports of the small mirrors $N_1$ are calculated.

When the angle formed by the straight line $a_1$ with the y-axis is $\beta_1$, the angle formed by the straight line $a_2$ with the y-axis is $\beta_2$ and the peripheral velocity of the photosensitive medium is $v_0$, then the movement velocity $v_1$ of the small mirror $N_1$ in the direction $\beta_1$ becomes a constant velocity, that is, $$v_1 = \frac{v_0 \sin\left(i_1 - \frac{\theta}{2}\right)}{2 \cos \frac{\theta}{2} \cdot \cos(i_1 - \beta_1)},$$

from $\overline{EG} = \overline{EF} \cdot \frac{\sin\left(i_1 - \frac{\theta}{2}\right)}{\sin(90° - i_1 \pm \beta_1)}, \overline{EF} = \overline{O_A O_B}$ in FIG. 1, and the movement velocity $v_2$ of the small mirror $N_2$ in the direction $\beta_2$ becomes a constant velocity, that is, $$v_2 = \frac{v_0 \cos i_1}{2 \cos \frac{\theta}{2} \cdot \sin\left(\beta_2 - \frac{\theta}{2} - i_1\right)},$$

from $\overline{JT} = \overline{HI} \cdot \frac{\sin(90° - i_1)}{\sin\left(\beta_2 - \frac{\theta}{2} - i_1\right)}, \overline{HI} = \overline{O_A O_B}$ in FIG. 1.

If the small mirrors $N_1$ and $N_2$ are moved on the respective predetermined quadratic curves along their reflection points $A_1$, $B_1$, $C_1$ and $A_2$, $B_2$, $C_2$, respectively, their movement velocities will vary, but this may be compensated for if, as described above, the support of the small mirror $N_1$ is moved at the constant velocity $v_1$ in the direction of straight line $a_1$ and the support of the small mirror $N_2$ is moved at the constant velocity $v_2$ in the direction of straight line $a_2$ so that the small mirrors $N_1$ and $N_2$ follow the respective predetermined quadratic curves. By this, the effective dimensions of the mirrors $N_1$ and $N_2$ can be minimized. Further, when the copying magnification is changed, quadratic curves $b_1$ and $b_2$ generally change, but the difference before and after the change in copying magnification can be minimized by the arrangement of the lens and small mirrors.

Also, the reflection points of the mirrors change for each copying magnification, but this may be compensated for by correspondingly increasing the effective portions thereof and even if this is taken into account, the size of the mirrors can be reduced as compared with the prior art.

Figure 2B:
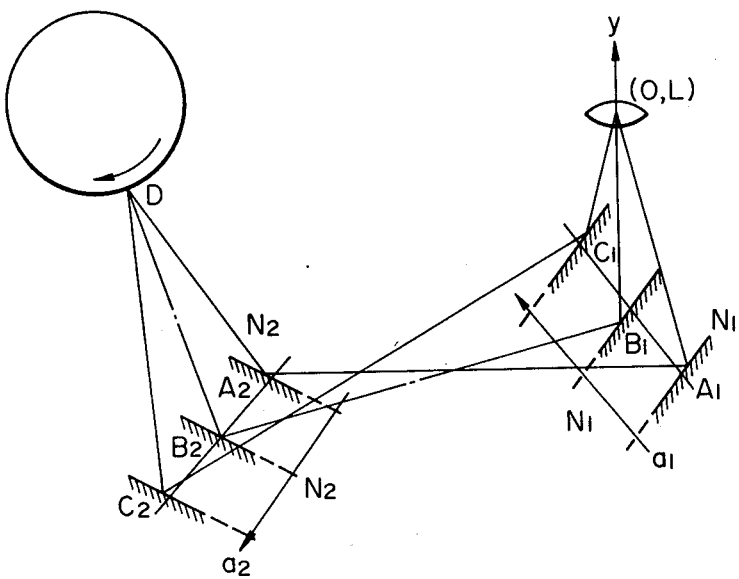

FIG. 2B shows a system in which the small mirrors $N_1$ and $N_2$ are moved with straight line loci approximate to the quadratic curve loci of the optical reflection point in FIG. 2A. The movement velocities $v_1$ and $v_2$ of the small mirrors are the same as those described in connection with FIG. 2A. The small mirror $N_1$ is moved with its support at the constant velocity $v_1$ in the direction of straight line $a_1$ and the small mirror $N_2$ is moved with its support at the constant velocity $v_2$ in the direction of straight line $a_2$.

Figure 3A:
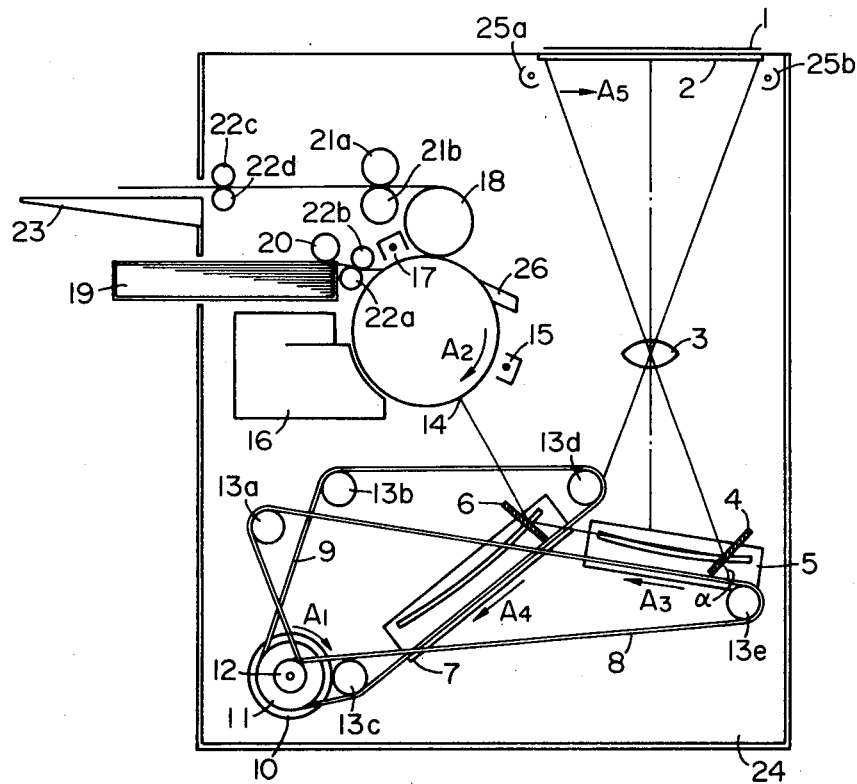
FIGS. 3A and 3B show the whole of a copying machine using the present invention.
Figure 3B:
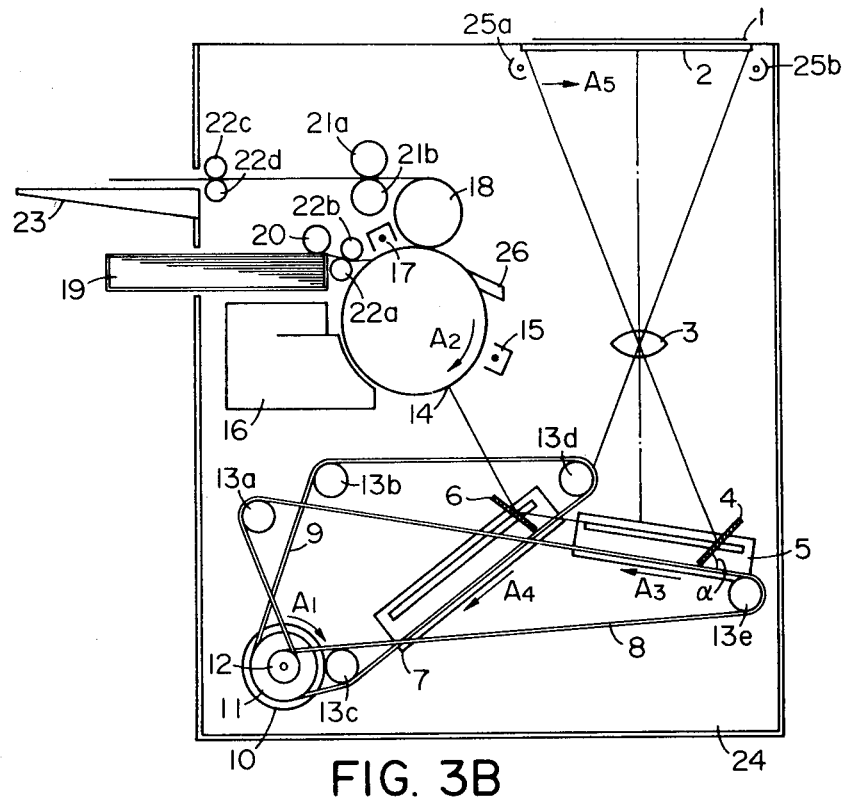

FIGS. 3A and 3B show an entire copying machine using the optical scanning device of FIGS. 2A and 2B.

FIGS. 3A and 3B include an original 1 to be copied, an original carriage 2 formed of a transparent material, a projection lens 3, a first movable small mirror 4, a cam plate 5 for controlling the movement locus of the first small mirror 4 when such mirror is moved, a second movable small mirror 6, a cam plate 7 for controlling the movement locus of the second small mirror 6 when such mirror is moved, a belt 8 for moving the first small mirror 4, a belt 9 for moving the second small mirror 6, a motor 10 for driving the belts 8 and 9 through pulleys 11 and 12 and for driving a photosensitive medium 14, guide rollers 13a, 13b, 13c, 13d and 13e, a charging corona 15, a developing device 16, a transfer charger 17, a paper supply cassette 19, a paper feed roller 20, fixing rollers 21a and 21b, paper transport rollers 22a, 22b, 22c and 22d, a paper discharge tray 23, a copying machine body 24, illumination lamps 25a and 25b for illuminating the whole surface of the original 1, and a cleaning blade 26. When the motor 10 is rotated in the direction of arrow $A_1$, the photosensitive medium 14 is rotated in the direction of arrow $A_2$ and the small mirrors 4 and 6 are moved in the directions of arrows $A_3$ and $A_4$, respectively, to effect the scanning of the original surface in the direction of arrow $A_5$.

Figure 4:
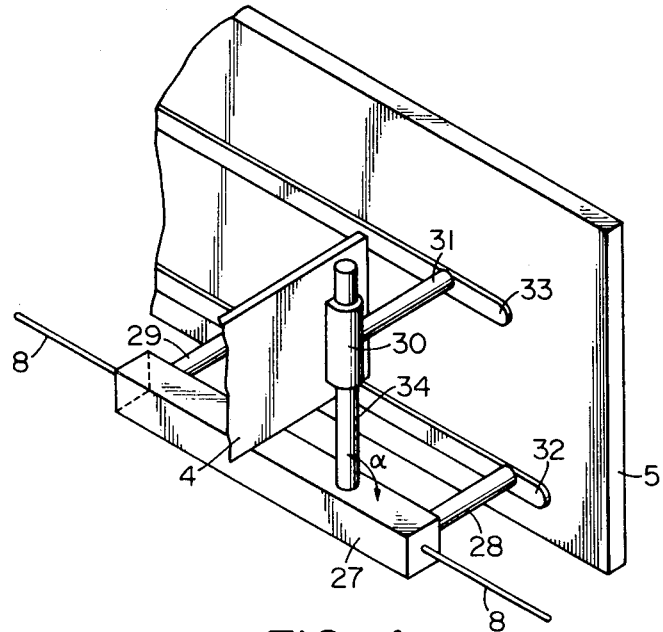
FIG. 4 illustrates a mechanism for moving the scanning mirrors and their supports.

Reference is now had to FIG. 4 to describe a mechanism for moving the small mirrors and their supports. Designated by 27 is a first small mirror supporting block fixed to the belt 8. Denoted by 28 and 29 are guide bars for causing the first small mirror supporting block 27 to be moved over a prescribed path along a straight groove 32 formed in the cam plate 5. Designated by 34 is a shaft secured to the first small mirror supporting block 27 with an inclination of an angle $\alpha$. The first small mirror 4 is slidable relative to the shaft 34 by means of a bearing 30 fixed to the first small mirror 4. A shaft 31 secured to the bearing 30 is fitted in a groove 33 formed in the cam plate 5 so as to provide a predetermined quadratic curve and thus, the first small mirror 4 may be moved on a predetermined quadratic curve with the rectilinear movement of the first small mirror supporting block 27. The second small mirror is of the same construction as the first small mirror.

The entire process will now be shown. In FIGS. 3A and 3B, when the original 1 is placed on the original carriage 2 and an unshown copy button is depressed, the motor 10 is rotated in the direction of arrow $A_1$, so that the photosensitive medium 14 starts to rotate in the direction of arrow $A_2$ and the first small mirror 4 and the second small mirror 6 start to move in the directions of arrows $A_3$ and $A_4$, respectively. The then angle between the first small mirror 4 and the second small mirror 6 is at a positional relation which satisfies the previously described optical path, and the velocity $v_1$ of the first small mirror 4 and the velocity $v_2$ of the second small mirror 6 can be obtained by selecting the diameters of the pulleys 11 and 12 to suitable values. The images provided by the scanning of the first small mirror 4 and the second small mirror 6 are successively projected upon the rotating photosensitive medium 14. In the meantime, the charging corona 15, developing device 16, image transfer corona 17 and cleaning blade 26 which are disposed around the photosensitive medium may be operated in accordance with the ordinary copying process. Also, at a predetermined period of time, paper is fed from the cassette 19 by the paper supply roller 20 in synchronism with the rotation of the photosensitive medium 14 and image transfer is effected, whereafter the paper passes the separating roller 18 and between the fixing rollers 21a and 21b and is discharged onto the paper discharge tray 23.

Thus, according to the present invention, the supports of the scanning mirrors are moved at constant velocity in directions of different predetermined straight lines and along therewith, the scanning mirrors are moved at varying velocity on predetermined quadratic curves or at constant velocity on predetermined straight lines approximate to the quadratic curves, whereby there can be provided an optical scanning device in which the scanning mirrors are made compact.

What I claim is:
1. An optical scanning device comprising:
   a lens system for projecting an image of an original onto an image surface;
   two scanning mirrors disposed along an optical path between said lens system and the image surface;
   two mirror supports for said scanning mirrors, said supports being movable rectilinearly at predetermined constant speeds in different directions, each of said mirror supports including holding means for holding thereon an associated one of said scanning mirrors for relative movement between the associated one of said scanning mirrors and its mirror support while maintaining a constant angle therebetween;
   driving means for driving said two mirror supports; and
   means for controlling the movement of said scanning mirrors in cooperation with said holding means such that during movement of said mirror supports said scanning mirrors are moved respectively along predetermined quadratic curves each substantially corresponding to a locus of optical reflection points, whereby a constant angle is maintained between each of said scanning mirrors and the original.

2. An optical scanning device according to claim 1, wherein upon a magnification change, each of said two scanning mirrors is moved along another quadratic curve corresponding to the selected magnification while said mirror supports are moved at constant speeds irrespective of the magnification.

3. An optical scanning device according to claim 1, wherein each of said holding means includes a shaft secured to its associated mirror support and each of said scanning mirrors is freely movable along its associated shaft.

4. An optical scanning device according to claim 1, wherein one of said scanning mirrors closer to said lens system is movable along a quadratic curve defined by $$y^2 - (L + l + x \tan i_1)y + L\left\{\frac{1}{2}\left(\tan i_1 + \tan \frac{\theta}{2}\right)x + l\right\} = 0$$

where the y-axis is in accord with the optical axis and the x-axis is in accord with the image plane in the absence of said scanning mirrors, $i_1$ is the angle of incidence of the incidence optical axis on one of said scanning mirrors, $\theta$ is the angle formed between the incidence optical axis of one of said scanning mirrors and the emergence optical axis of the other of said scanning mirrors, L is the length of the optical axis between said lens system and the image plane, and l is the length of the optical axis between the reflection point on the one of said scanning mirrors and the image plane when the principal light ray is coincident with the optical axis of said lens system.

5. An optical scanning device comprising:

a lens system for projecting an image of an original onto an image surface;

two scanning mirrors deposed along an optical path between said lens system and the image surface; and means for translating each of said scanning mirrors, while maintaining a constant angle relative to the original, along a predetermined quadratic curve substantially corresponding to a locus of optical reflection points.

* * * * *